(12) United States Patent
Huetter et al.

(10) Patent No.: US 9,378,059 B2
(45) Date of Patent: Jun. 28, 2016

(54) MULTI-THREADED, LOCKLESS DATA PARALLELIZATION

(71) Applicant: Argyle Data, Inc., San Mateo, CA (US)

(72) Inventors: Raymond J. Huetter, San Mateo, CA (US); Craig A McIntyre, San Mateo, CA (US); Myvan Quoc, Fremont, CA (US); David I. Cracknell, Cupertino, CA (US); Alka Yamarti, Gachibowi (IN); David I Gotwisner, Castro Valley, CA (US)

(73) Assignee: Argyle Data, Inc., San Mateo, CA (US)

( * ) Notice: Subject to any disclaimer, the term of this patent is extended or adjusted under 35 U.S.C. 154(b) by 0 days.

(21) Appl. No.: 14/436,822

(22) PCT Filed: Oct. 18, 2013

(86) PCT No.: PCT/US2013/065707
§ 371 (c)(1),
(2) Date: Apr. 17, 2015

(87) PCT Pub. No.: WO2014/063067
PCT Pub. Date: Apr. 24, 2014

(65) Prior Publication Data
US 2015/0331720 A1 Nov. 19, 2015

Related U.S. Application Data

(60) Provisional application No. 61/716,174, filed on Oct. 19, 2012.

(51) Int. Cl.
G06F 9/46 (2006.01)
G06F 9/45 (2006.01)
(Continued)

(52) U.S. Cl.
CPC .............. G06F 9/5016 (2013.01); G06F 9/524 (2013.01); G06F 9/544 (2013.01); G06F 17/30321 (2013.01)

(58) Field of Classification Search
CPC ....... G06F 9/5016; G06F 9/524; G06F 9/544; G06F 17/30321
USPC .......................................... 717/149; 718/104
See application file for complete search history.

(56) References Cited

U.S. PATENT DOCUMENTS 7,620,753 B1   11/2009 Beaman et al.
8,099,546 B2 *  1/2012 Rostedt ............... G06F 11/3636
                                              711/110

(Continued)

OTHER PUBLICATIONS

Desnoyers et al., "Lockless Multi-Core High-Throughput Buffering Scheme for Kernel Tracing", 2009, ACM, 30 pages.*

(Continued)

Primary Examiner — Ted T Vo
(74) Attorney, Agent, or Firm — Shumaker & Sieffert, P.A.

(57) ABSTRACT

In general, techniques are described for parallelizing a high-volume data stream using a data structure that enables lockless access by a multi-threaded application. In some examples, a multi-core computing system includes an application that concurrently executes multiple threads on cores of the system. The multiple threads include one or more send threads each associated with a different lockless data structure that each includes both a circular buffer and a queue. One or more receive threads serially retrieve incoming data from a data stream or input buffer, copy data blocks to one of the circular buffers, and push metadata for the copied data blocks to the queue. Each of the various send threads, concurrent to the operation of the receive threads, dequeues the next metadata from its associated queue, reads respective blocks of data from its associated circular buffers based on metadata information, and offloads the block to a server.

30 Claims, 9 Drawing Sheets

(51) Int. Cl.
*G06F 9/50* (2006.01)
*G06F 17/30* (2006.01)
*G06F 9/52* (2006.01)
*G06F 9/54* (2006.01)

(56) References Cited

U.S. PATENT DOCUMENTS

| | | | |
|---|---|---|---|
| 8,279,885 B2* | 10/2012 | Riddle | G06F 9/526 370/389 |
| 8,504,744 B2* | 8/2013 | Khawer | G06F 9/5011 710/36 |
| 2009/0204755 A1 | 8/2009 | Rushworth et al. | |
| 2010/0332755 A1 | 12/2010 | Bu et al. | |
| 2014/0089539 A1* | 3/2014 | Hudzia | G06F 9/52 710/52 |

OTHER PUBLICATIONS

Fusco et al., "High Speed Network Traffic Analysis with Commodity Multi-core Systems", 2010, ACM, pp. 218-224.*

Jake Edge, "A Lockless ring-buffer", Jul. 2009, Retrieved from LWN.net, Eklektix, Inc., 4 pages.*

International Search Report and Written Opinion of counterpart application PCT/US2013/065707, mailed Jan. 24, 2014, 16 pp.

* cited by examiner

MULTI-THREADED, LOCKLESS DATA PARALLELIZATION

PRIORITY CLAIM

This application is a national stage entry under 35 U.S.C. §371 of International Application No. PCT/US2013/065707 filed Oct. 18, 2013, which claims the benefit of U.S. Provisional Application No. 61/716,174, filed Oct. 19, 2012; the entire content of which being incorporated herein by reference.

TECHNICAL FIELD

The disclosure relates to computer systems and, more specifically, to parallelizing a data stream for distributed processing within a computer system.

BACKGROUND

Explosive growth in global data volume, ubiquity of devices connecting to networks, lower barriers of entry for user content creation and sharing, digitization of many formerly offline functions (banking, medical prescriptions, etc.), emergence of virtualized and offsite networked systems (clouds), among other factors, have contributed to the emergence of the "Big Data" era. This presents challenges for systems, as applications processing faces extreme massive volume throughput and requirements to deliver or distribute processed data to any number of destination points. These systems additionally must be scalable to keep pace with the continuing growth of Big Data and enable interactivity for pervasive, large audience Internet and cloud applications.

The utilization of multi-core processors has increased dramatically in the computing industries. In general, the term "processor" refers to the unit of hardware that reads and executes program instructions. Historically, processors originally utilized a single "core," which refers to the portion of the processor that reads and executes a sequence of instructions. A multi-core processor refers to a single hardware unit in which two or more independent processing "cores" are integrated onto a single package. Recently, computing systems having upwards of 128 to 256 processing cores have become available.

SUMMARY

In general, techniques are described for parallelizing a high-volume data stream using a data structure that enables lockless access by a multi-threaded application. In some examples, a multi-core computing system includes an application that concurrently executes multiple threads on cores of the multi-core computing system. The multiple threads include one or more send threads and one or more receive threads. Each of the send threads is associated with a different lockless data structure that each includes both a circular buffer and a queue. The one or more receive threads serially retrieve incoming data from a data stream or input buffer, copy a data block to one of the circular buffers, and push metadata for the copied data block to the corresponding queue. Each of the various send threads, concurrent to the operation of the receive threads, dequeues the next metadata from its associated queue, reads respective blocks of data from its associated circular buffers based on metadata information, and offloads the blocks of data to one or more servers for further processing and/or storage. Because the multi-threaded application deploys multiple send threads, each with an associated data structure, the multi-threaded application may effectively parallelize the data stream to allow wire-speed or near-wire-speed processing by the servers, even at high volumes. Execution of the multi-threaded application in accordance with the described techniques may permit multi-threaded access to each of the data structures in a lockless manner while retaining atomicity of the access operations and requiring only a single copy operation for a data block to the system memory space, thus reducing the needed utilization of the various cores and concomitantly reducing the resources required to offload the input stream.

In some examples, multiple multi-core computing systems that accord with the described techniques may be deployed in a hierarchy, such that the output of a send thread on one such computing system is an input stream to a receive thread on another such computing system. Alternatively, multiple servers that receive and process output data streams from send threads for one such computing system may direct each of the processed data streams to another such computing system, where the agglomeration of the processed data streams are an input stream for the downstream computing system.

In one example, a data offload system comprises a multi-core hardware processor having a plurality of execution cores. The data offload system also comprises an offload application to execute on the multi-core hardware processor, wherein the offload application comprises a plurality of threads. The data offload system further comprises an input interface to receive an incoming data stream and write a plurality of data blocks of the incoming data stream to an input buffer accessible to the offload application. The data offload system also comprises a first lockless buffer and a second lockless buffer. The data offload system further comprises a receive thread of the plurality of threads to read a first one the plurality of data blocks from the input buffer and to read a second one the plurality of data blocks from the input buffer, wherein the receive thread performs a first write operation to write the first data block to the first lockless buffer without locking the first lockless buffer to allow access to the first lockless buffer by other threads of the plurality of threads while the receive thread performs the first write operation, and wherein the receive thread performs a second write operation to write the second data block to the second lockless buffer without locking the second lockless buffer to allow access to the second lockless buffer by other threads of the plurality of threads while the receive thread performs the second write operation. The data offload system also comprises a first send thread of the plurality of threads to perform a first send operation to send the first data block from the first lockless buffer without locking the first lockless buffer to allow access to the first lockless buffer by other threads of the plurality of threads while the first send thread performs the first send operation. The data offload system further comprises a second send thread of the plurality of threads to perform a second send operation to send the second data block from the second lockless buffer without locking the second lockless buffer to allow access to the second lockless buffer by other threads of the plurality of threads while the second send thread performs the second send operation.

In another example, a method comprises receiving an incoming data stream, writing a plurality of data blocks to an input buffer, and executing, with a multi-core hardware processor having a plurality of execution cores, an offload application that includes a first lockless buffer, a second lockless buffer, and a plurality of threads that include a first receive thread, a first send thread, and a second send thread. The method also comprises reading, with the receive thread, a first one the plurality of data blocks and a second one the plurality of data blocks from the input buffer. The method further comprises performing a first write operation, with the receive thread, to write the first data block to the first lockless buffer without locking the first lockless buffer to allow access to the first lockless buffer by other threads of the plurality of threads while the receive thread performs the first write operation. The method also comprises performing a second write operation, with the receive thread, to write the second data block to the second lockless buffer without locking the second lockless buffer to allow access to the second lockless buffer by other threads of the plurality of threads while the receive thread performs the second write operation. The method further comprises performing a first send operation, with the first send thread, to send the first data block from the first lockless buffer without locking the first lockless buffer to allow access to the first lockless buffer by other threads of the plurality of threads while the first send thread performs the first send operation. The method also comprises performing a second send operation, with the second send thread, to send the second data block from the second lockless buffer without locking the second lockless buffer to allow access to the second lockless buffer by other threads of the plurality of threads while the second send thread performs the second send operation.

In another example, a non-transitory computer-readable medium comprises instructions that, when executed, cause a multi-core processor to receive an incoming data stream, write a plurality of data blocks to an input buffer, and execute an offload application that includes a first lockless buffer, a second lockless buffer, and a plurality of threads that include a first receive thread, a first send thread, and a second send thread. The instructions further cause the processor to read, with the receive thread, a first one the plurality of data blocks and a second one the plurality of data blocks from the input buffer. The instructions also cause the processor to perform a first write operation, with the receive thread, to write the first data block to the first lockless buffer without locking the first lockless buffer to allow access to the first lockless buffer by other threads of the plurality of threads while the receive thread performs the first write operation. The instructions also cause the processor to perform a second write operation, with the receive thread, to write the second data block to the second lockless buffer without locking the second lockless buffer to allow access to the second lockless buffer by other threads of the plurality of threads while the receive thread performs the second write operation. The instructions further cause the processor to perform a first send operation, with the first send thread, to send the first data block from the first lockless buffer without locking the first lockless buffer to allow access to the first lockless buffer by other threads of the plurality of threads while the first send thread performs the first send operation. The instructions also cause the processor to perform a second send operation, with the second send thread, to send the second data block from the second lockless buffer without locking the second lockless buffer to allow access to the second lockless buffer by other threads of the plurality of threads while the second send thread performs the second send operation.

This disclosure also describes devices, computing devices, apparatuses, and computer-readable mediums storing instructions that may be configured to perform the techniques for multi-threaded, lockless data parallelization described herein.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
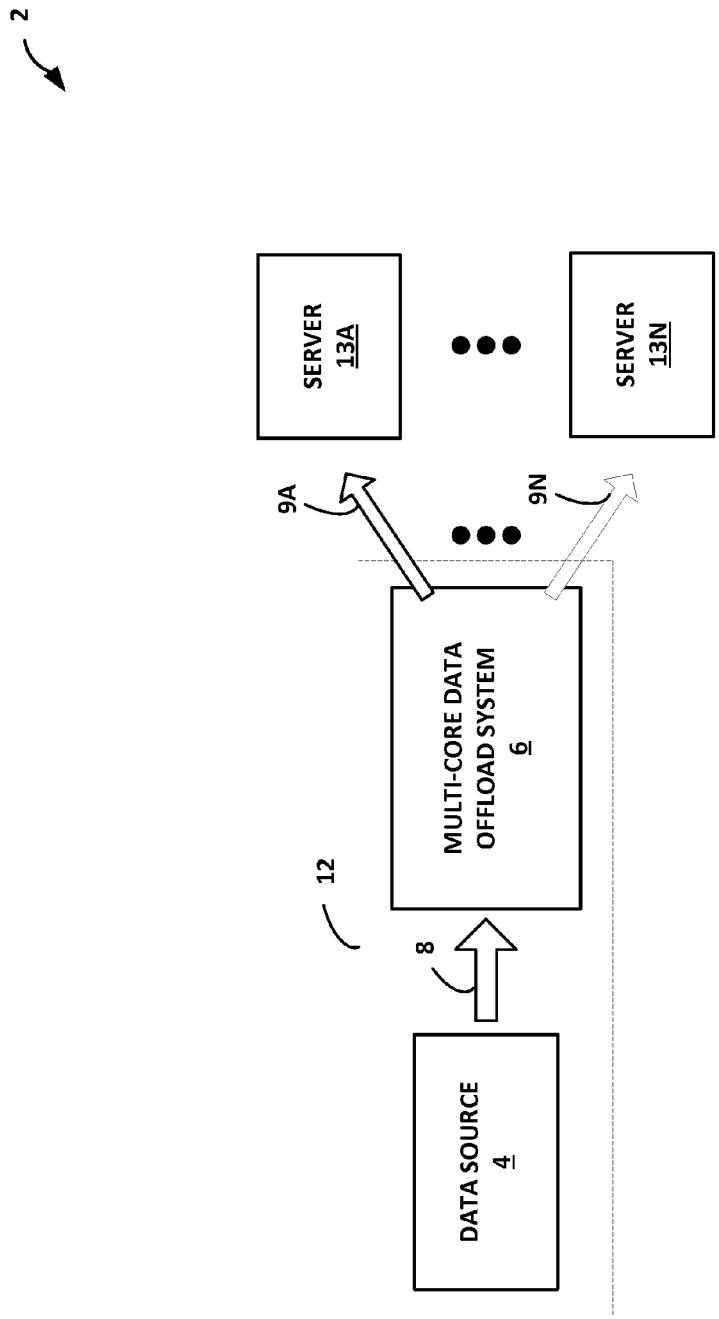
FIG. 1 is a block diagram illustrating an example system that utilizes the techniques described herein to provide high-volume data offload.

FIG. 1 is a block diagram illustrating an example system that utilizes the techniques described herein to provide high-volume data offload and/or distribution. In the example system 2 of FIG. 1, a multi-core data offload system 6 parallelizes, using one or more data structures that enable lockless access by a multi-threaded application, an incoming data stream 8 from a data source 4 into a plurality of data streams 9A-9N (collectively. "data streams 9"). Multi-core data offload system 6 offloads and/or distributes data streams 9 to one or more servers 13A-13N (collectively. "servers 13"). Data source 4 may be anything that sources packetized data, such as one or more systems, applications, databases, computer networks, scientific instrumentation, and real-time video capture devices. In some instances, incoming data stream 8 may approach or even exceed 100 Gbps. Multi-core data offload system 6 may include a load balancer for a data center, for instance. Servers 13 process respective offload data streams 9 for analysis and/or storage to a storage device (not shown in FIG. 1). Data source 4 in combination with multi-core data offload system 6 may thus effectively form a data source 12 for high-speed delivery of parallel data streams 9 to servers 13. An example instance of one of servers 13 is described with respect to FIG. 9, below.

Figure 2:
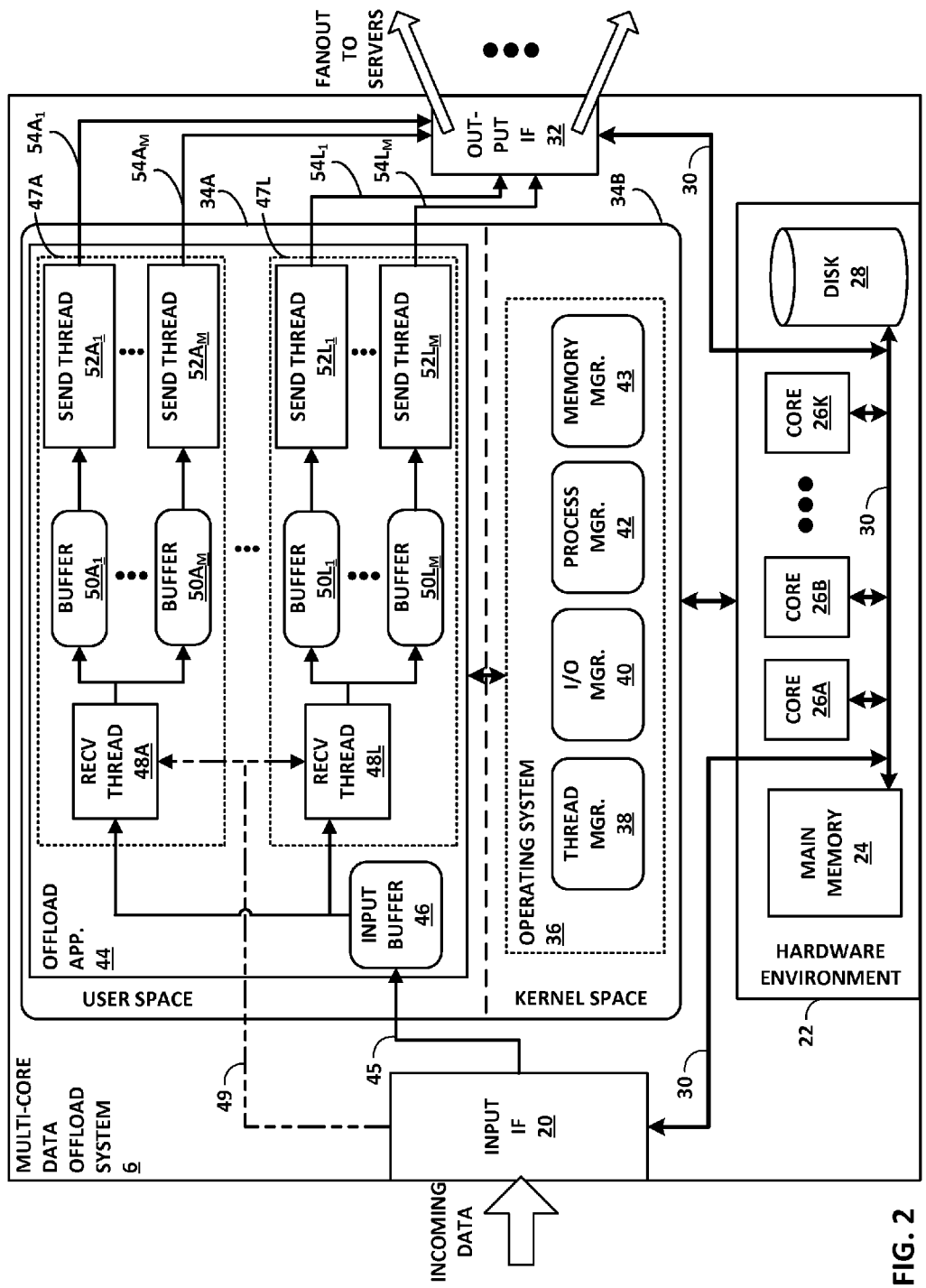
FIG. 2 is a block diagram illustrating, in further detail, an example instance of a multi-core offload system that operates according to techniques described in this disclosure.

FIG. 2 is a block diagram illustrating, in further detail, an example instance of a multi-core offload system 6 that operates according to techniques described in this disclosure. In this example, multi-core offload system 6 includes a main memory 24, persistent storage disk 28, and a plurality of cores 26A-26K (collectively. "cores 26") of one or more multi-core hardware processors that together constitute hardware environment 22. Components of hardware environment 22, as well as input interface 20, and output interface 32, are connected by bus 30, which may represent one or more system and/or peripheral busses.

Disk 28 comprises computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM). EEPROM, Flash memory, CD-ROMs, digital versatile discs (DVDs) or other optical storage, magnetic cassettes, magnetic tape, magnetic disk storage or other magnetic storage devices, or any other medium that can be used to store the desired information and that can be accessed by cores 26.

Main memory 24 comprises one or more computer-readable storage media, which may include random-access memory (RAM) such as various forms of dynamic RAM (DRAM), e.g., DDR2 SDRAM, or static RAM (SRAM). Flash memory, or any other form of fixed or removable storage medium that can be used to carry or store desired program code and program data in the form of instructions or data structures and that can be accessed by cores 26. Main memory 24 provides a physical address space composed of addressable memory locations. Operating system 36 of multi-core data offload system 6 partitions the physical address space of main memory 24 into user space 34A, allocated for running user processes, and kernel space 34B, which is protected and generally inaccessible by user processes. Main memory 24 may permit multiple concurrent read/write operations.

Operating system 36, executing in kernel space, provides an operating environment for offload application 44 (illustrated as "offload app. 44"), which may run as a process in user space 34A of main memory 40. Examples of operating system 36 may include Berkeley Software Distribution (BSD), which is available in free and commercial variants, other Unix variants such as Unix or Linux, Microsoft Windows, and VxWorks. Operating system 36 includes certain kernel processes, including thread manager 38, process manager 42, input/output ("I/O") manager 32, and memory manager 43. Process manager 42 (illustrated as "process mgr. 42") multitasks user processes by initializing, scheduling, and switching processes for operating system 36 for access to multi-core data offload system resources, including cores 26.

Thread manager 38 (illustrated as "thread mgr. 38") manages instantiation and execution of application threads, including receive threads 48A-48L (collectively, "receive threads 48") and send threads 52A$_1$-52L$_M$ (collectively, "send threads 52") of offload application 44. For example, thread manager 38 may allocate the threads among cores 26 for execution by time-slicing access of the threads to cores 26, including thread switching operations, thread suspend, thread resume, thread wait. Thread manager 38 may also perform thread cleanup.

I/O manager 40 (illustrated as "I/O mgr. 40") provides an interface, e.g., system calls, to enable offload application 44 to exchange data and/or instructions with main memory 24 and disk 28 and to direct main memory 24 and disk 28 to exchange data and/or instructions with each other. I/O manager 40 includes device drivers for main memory 24 and disk 28. In some embodiments, multi-core data offload system 6 may interface with peripheral devices, such as a keyboard, a computer mouse, or a display device (not shown). In such embodiments, I/O manager 40 provides interfaces to the peripherals.

Memory manager 43 (illustrated as "memory mgr. 43") controls the allocation, use, and deallocation of physical address space provided by main memory 24 for multi-core data offload system processes, including kernel processes and offload application 44.

Multi-core data offload system 6 may, in some examples, implement virtual memory techniques that allow offload application 44 to experience an exclusive, contiguous addressable memory space when in fact offload application 44 shares the physical address space provided by main memory 24. In addition, the techniques may permit a larger address space than that provided by main memory 24, which simplifies program development and enables multitasking of memory-intensive processes. The total amount of address space required by processes running on hardware environment 22 may exceed the amount of physical address space provided by main memory 24. In the illustrated example, to increase the amount of address space available beyond the limitations of main memory 24, memory manager 43 may relocate blocks of memory from active primary memory (main memory 24) to disk 28, which provides secondary memory storage. Memory manager 43 swaps such memory blocks to and from main memory 24 and disk 28 as needed in order to provide physical memory space for an executing process.

When process manager 42 initiates execution of a process, including offload application 44, memory manager 43 typically allocates a stack and a heap within the virtual address space for the process. Memory manager 43 manages the heaps for the processes dynamically by temporarily allocating, when requested, blocks of memory for use by the requesting one of the processes and freeing the memory when the block of memory is freed by the process. Allocated memory blocks on the heap are referenced by a pointer that may be manipulated by processes. By contrast, stack memory generally is statically allocated when a function is called. Memory manager 43 represents operating system-level software that provides an interface with which processes request dynamically allocable address space from a process heap for use by the requesting process at run-time. In some embodiments, the interface is a system call that invokes a kernel function to allocate and return one or more blocks of memory for use by the invoking process. The interface provided by memory manager 43 may, for instance, be invoked using the well-known malloc function call, which invokes the sbrk system call.

Offload application 44 processes incoming data received by input interface 20 and parallelizes the incoming data for fanout to one or more servers reachable by output interface 32. Input interface 20 may represent a network interface card (NIC), a programmable NIC, an analog-to-digital converter coupled to a processor that together convert an incoming signal to a digital data stream, a video or other media input card that receives analog or digital media and converts the media to a digital data stream, a database interface, a Fibre Channel interface, and so on. Input interface 20 may write incoming data stream 45 that is a representation of the incoming data (e.g., a digital data stream generated according to one of the above examples) to input buffer 46 of offload application 44 via bus 30. Input buffer 46 may represent a portion of user space 34A that is memory-mapped specifically for use by input interface 20. A Direct Memory Access (DMA) controller (not shown) may independently transfer data stream 45 from input interface 20, i.e., without the participation of any of cores 26, to input buffer 46.

Offload application 44 includes offload groups 47A-47L (collectively, "offload groups 47") each having a plurality of threads and data structures that cooperate to parallelize data stream 45 written to input buffer 46 into a plurality of parallelized output data streams $54A_1$-$54L_M$ (collectively. "output data streams 54") by output interface 32. For each of offload groups 47, a plurality of send threads 52 are each associated with a different one of lockless buffers $50A_1$-$50L_M$ (collectively, "buffers 50") and collectively associated with a single one of receive thread 48 (each illustrated as a "recv thread"). For example, offload group 47A includes a single receive thread 48A (illustrated as "recv thread 48A"), a plurality of buffers $50A_1$-$50A_M$ (collectively, "buffers 50A") and a plurality of send threads $52A_1$-$52A_M$. Operation of receive threads 48 and send threads 52 for the various offload groups 47 is described below with respect to offload group 47A, which may include substantially similar components (e.g., threads 48, 52 and buffers 50) and operate substantially similarly to remaining offload groups 47B-47L. In some cases, offload application 44 includes only a single offload group 47.

Receive thread 48A of offload group 47A copies, from input buffer 46, data blocks that constitute portions of data stream 45 to buffers 50A. Data blocks may vary in length. Receive thread 48 may write data blocks to buffers 50A by round-robin, according to respective buffers 50 utilization (i.e., allocate to lightly-loaded buffers), or another method of allocation. Each copy operation by receive thread 48A may include a call to a library operating in user space, which retrieves a pointer to the next data block and, in some instances, a data block length that allows receive thread 48A copy the referenced next data block to one of buffers 50A. Data blocks may represent, for instance, Ethernet datagrams, Internet Protocol packets, Asynchronous Transfer Mode (ATM) cells, data constituting a run of a scientific instrument, a video frame or video coding block, an image, a block of instrument data, and so on.

In some examples, the input interface 20 delivers each received data block (or a reference to a copy of the received data block) to each of the receive threads 48 by notifications 49. In other words, input interface 20 prompts, using notifications 49, each of the receive threads 48 to offer a newly-received data block to each of the receive threads 48 for processing. Receive threads 48 may then arbitrate which of receive threads 48 is to process the data block and, therefore, which offload groups 47 will offload the data block with one of its send thread 52. Receive threads 48 may, for example, arbitrate processing of a newly-received data block by each applying an arbitration function (e.g., a hash or cyclic-redundancy-check (CRC) function) to all or a portion of the data block that results in an identifier for one of receive threads 48. In cases in which the data block is a layer 3 (L3) packet, for instance, receive threads 48 may apply the arbitration function to the L3 header of the L3 packet. This may enable offload application 44 to consistently process any given packet flow (identifiable, e.g., by the IP-5-tuple or any n-tuple thereof) with the same one of receive threads 48.

As one example of the application of an arbitration function, receive threads 48 may each be associated with one or more hash buckets of a hash function applied by receive threads 48 for purposes of arbitrating data block processing. If receive thread 48A, e.g., is associated with the hash bucket to which a newly-received data block is hashed, then receive thread 48A writes the data block to one of its associated buffers 50A for offloading by one of associated send threads 52A.

Returning now to the operation of threads of offload group 47, each of send threads 52A reads data blocks from its associated one of buffers 50A and sends the data blocks as a separate one of data streams $54A_1$-$54A_M$ by output interface 32. The terms "send," "sending," and variants thereof as performed by any of send threads 52 or send threads 86 refers to reading one or more data blocks from a buffer and sending the read data block(s) by output interface 32. Output interface 32 may represent a NIC, a programmable NIC, a Fibre Channel interface, a database interface, or any other suitable interface for outputting digital data from multi-core data offload system 6. In some instances, a user library (e.g., a dynamic-link library or DLL) or other code executable as part of offload application 44 may execute to transform or otherwise process data in buffers 50A prior to output by send threads 52A.

Receive thread 48A and send threads 52 may execute concurrently on cores 26. For example, receive thread 48A may execute on core 26A while send thread $52A_1$ executes concurrently on core 26B, send thread $52A_2$ executes concurrently on core 26C, and so on through send thread $52A_M$. As another example, receive thread 48A may execute on core 26A and be switched out, by thread manager 38, to allow send thread $52A_1$ to execute on core 26A while send thread $52A_M$ executes concurrently on core 26B.

Each of buffers 50A is a lockless buffer that enables atomic accesses by receive thread 48A and send threads 52A operating according to techniques described herein. For example, receive thread 48A executing on core 26A may access buffer $50A_1$ to perform an operation that includes writing a data block from input buffer 46 to buffer $50A_1$. If interrupted by thread manager 38 to allow send thread $52A_1$ to execute, or if send thread $52A_1$ otherwise accesses buffer $50A_1$ before receive thread 48 completes the operation, then the receive thread 48 write operation will not be corrupted by the operations of send thread $52A_1$. As a result, receive thread 48A and send threads 52A may eschew deploying synchronization primitives, such as mutexes, locks, semaphores, and monitors, that are used by computing applications seeking atomicity of concurrently executing operations. Further, because each of buffers 50 (i.e., each of buffers 50A, 50B, . . . , 50N) is strictly associated with a single one of receive threads 48, receive threads 48 operations with respect to buffers 50 are mutually exclusive and may therefore avoid corrupting the operations of other receive threads 48 made with respect to buffers 50.

In some examples, a separate instance of offload application 44 executes each of offload groups 47. The number of send threads 52 executing, the size of buffers 50, and the number of offload groups 47 may be user configurable, e.g., by command-line arguments to offload application(s) 44.

Figure 3:
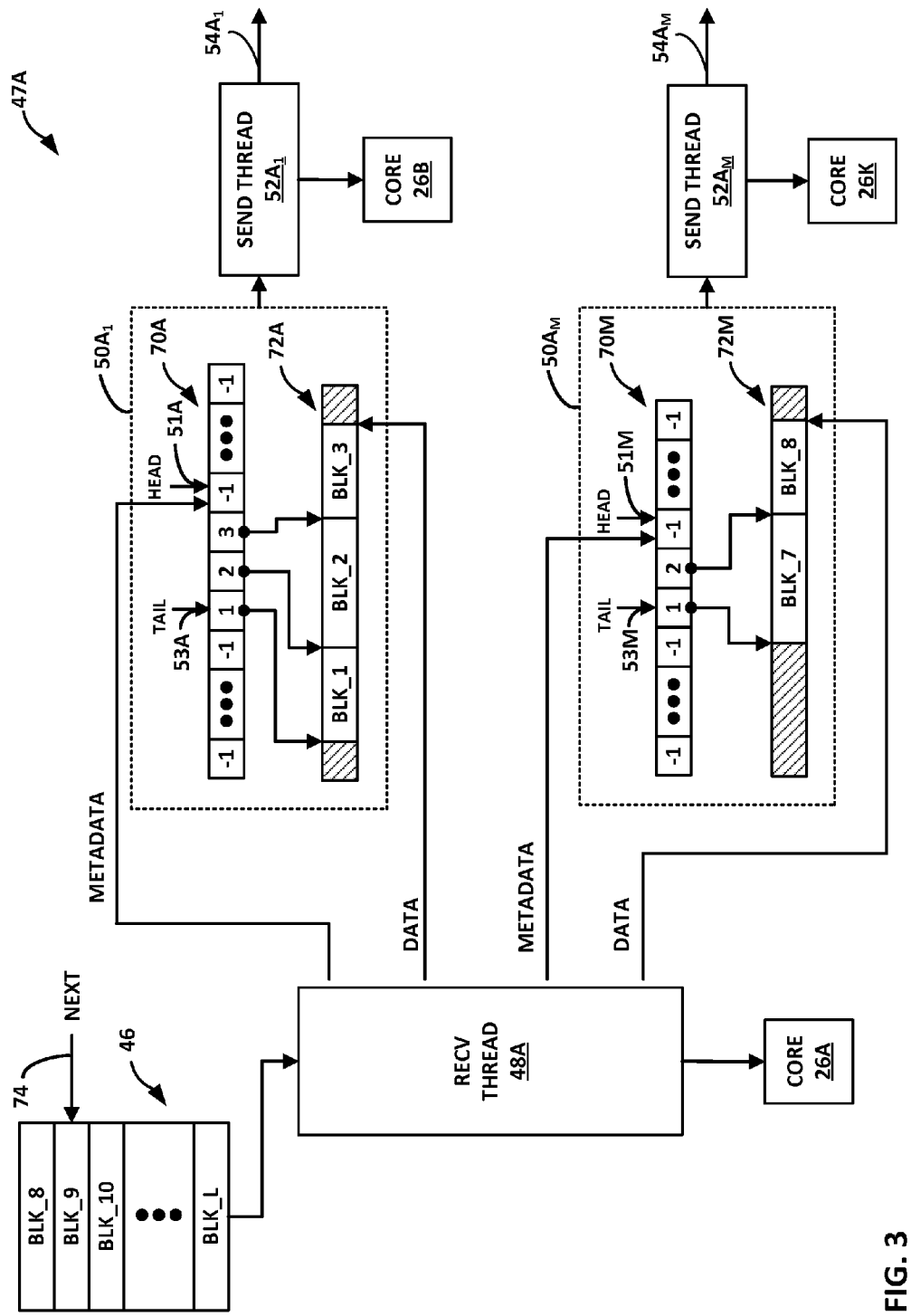
FIG. 3 is a block diagram illustrating, in further detail, an offload group having a receive thread and a plurality of send threads each associated with a lockless data structure in accordance with techniques described herein.

FIG. 3 is a block diagram illustrating, in further detail, an offload group having a receive thread and a plurality of send threads each associated with a lockless data structure. In this example of offload group 47A, each of receive thread 48A and send threads 52A is illustrated as concurrently executing on a different one of cores 26. As described above with respect to FIG. 2, threads may time-slice among cores 26 during execution. Each of offload groups 47 may include substantially similar components operating substantially similarly. Different offload groups 47 may have different numbers of buffers 50 and send threads 52.

Input buffer 46 of offload application 44 stores data blocks. Next reference 74 indicates a next data block in input buffer 46 to be processed by offload groups 47. Next reference 74 may in some instances be stored and updated by a user-level library instantiated by offload application 44, which returns next reference 74 to receive thread 48A of offload group 47A in response to a library call. In some instances, offload application 44 stores and explicitly updates next reference 74. Next reference 74 may include a pointer that, when dereferenced, provides a location in physical or virtual memory space. Next reference 74 may also include, or refer to, a length of the data block being referenced.

In this example, each of buffers 50A includes a circular buffer for data block storage and a first-in-first-out (FIFO) data structure (e.g., a queue) having FIFO entries that store metadata for the data blocks in the circular buffer. For example, buffer $50A_1$ includes circular buffer 72A and FIFO 70A that is a FIFO data structure. FIFOs 70A-70M and circular buffers 72A-72M are collectively referred to as "FIFOs 70" and "circular buffers 72," respectively. Each of buffers 50A includes substantially similar components providing substantially similar functionality, said components and functionality being described hereinafter with respect to buffer $50A_1$.

FIFO 70A includes a head reference, "head index 51A," that references a head FIFO entry (or "head entry"), i.e., the next empty entry for the queue that will receive the contents of an enqueue operation made with respect to FIFO 70A. FIFO 70A also includes a tail reference, "tail index 53A," that references the tail FIFO entry, i.e., the next FIFO entry to be returned in response to a dequeue operation made with respect to FIFO 70A. FIFO 70A may be implemented as an instance of a class having data members including an array of FIFO entries, a tail index, and a head index. Each of the FIFO entries of FIFO 70A references an entry number or an empty value (here illustrated as −1). For example, the FIFO entry number referenced by the tail reference of FIFO 70A has value 1, which may correspond to the first data block copied from input buffer 46 and stored to circular buffer 72A. As another example, the FIFO entry number referenced by the head index 51A of FIFO 70A includes the empty value (−1). The size of circular buffers 72 and the number of entries of FIFOs 70 may be user configurable, e.g., by command-line arguments to offload application 44. In some instances, each of the FIFO entries of FIFO 70A also includes a length of the data block. Each of circular buffers 72 may represent memory space in main memory 24. In some examples, each of circular buffers 72 represents a different memory space that is contiguous in main memory 24.

Receive thread 48A copies data blocks from input buffer 46 to circular buffers 72, thus "spraying" the data blocks across multiple different instances of a buffer. For example, receive thread 48 uses next reference 74 to input buffer 46 to identify the next data block for processing. Receive thread 48A may process the next data block to determine a data block length and, in some instances, other metadata for the next data block. Receive thread 48A uses the head index 51A of FIFO 70A to determine the next empty location in FIFO 70A and writes the metadata for the next data block to the next empty location without requesting a lock or employing any other synchronization mechanism with respect to FIFO 70A. This constitutes a push operation to FIFO 70A. Receive thread 48A also copies the next data block to the next open memory location in circular buffer 72A without requesting a lock or employing any other synchronization mechanism with respect to circular buffer 72A. Receive thread 48A may update the head index 51A of FIFO 70A, next reference 74, and in some instances may update a reference to the next open memory location in circular buffer 72A (not shown). Receive thread 48A may then perform a similar operation with respect to buffer $50A_M$ having FIFO 70M and circular buffer 72M.

As receive thread 48A copies data blocks from input buffer 46 to circular buffers 72, send threads $52A_1$-$52A_M$ concurrently execute to read data blocks from respective circular buffers 72A-72M and output the read data blocks in respective output data streams $54A_1$-$54A_M$. For example, without requesting a lock or employing any other synchronization mechanism with respect to FIFO 70A, send thread $52A_1$ dequeues an entry of FIFO 70A containing metadata describing a data block stored by circular buffer 72A. Again, without requesting a lock or employing any other synchronization mechanism with respect to circular buffer 72A, send thread $52A_1$ uses the metadata of the dequeued entry to read the corresponding data block from circular buffer 72A, then outputs the data block as part of output data stream $54A_1$. Using lockless buffers 50 in this way, receive threads 48 and send threads 52 may operate concurrently to parallelize an incoming data stream.

In some instances, send threads 52 may process read data blocks and/or corresponding metadata to, for example, determine a server to receive the read data block. That is, in some instances, send threads 52 may select a server or server component to receive a read data block based upon properties of the read data block and or corresponding metadata. As one example, send thread $52A_1$ may identify a packet flow of a read data block that includes a network packet and send the read data block to a server that is processing the packet flow. As another example, send thread $52A_1$ may determine that a read data block is a video coding block of a video frame being processed by a particular server and send the read data block to the server.

Figure 4:
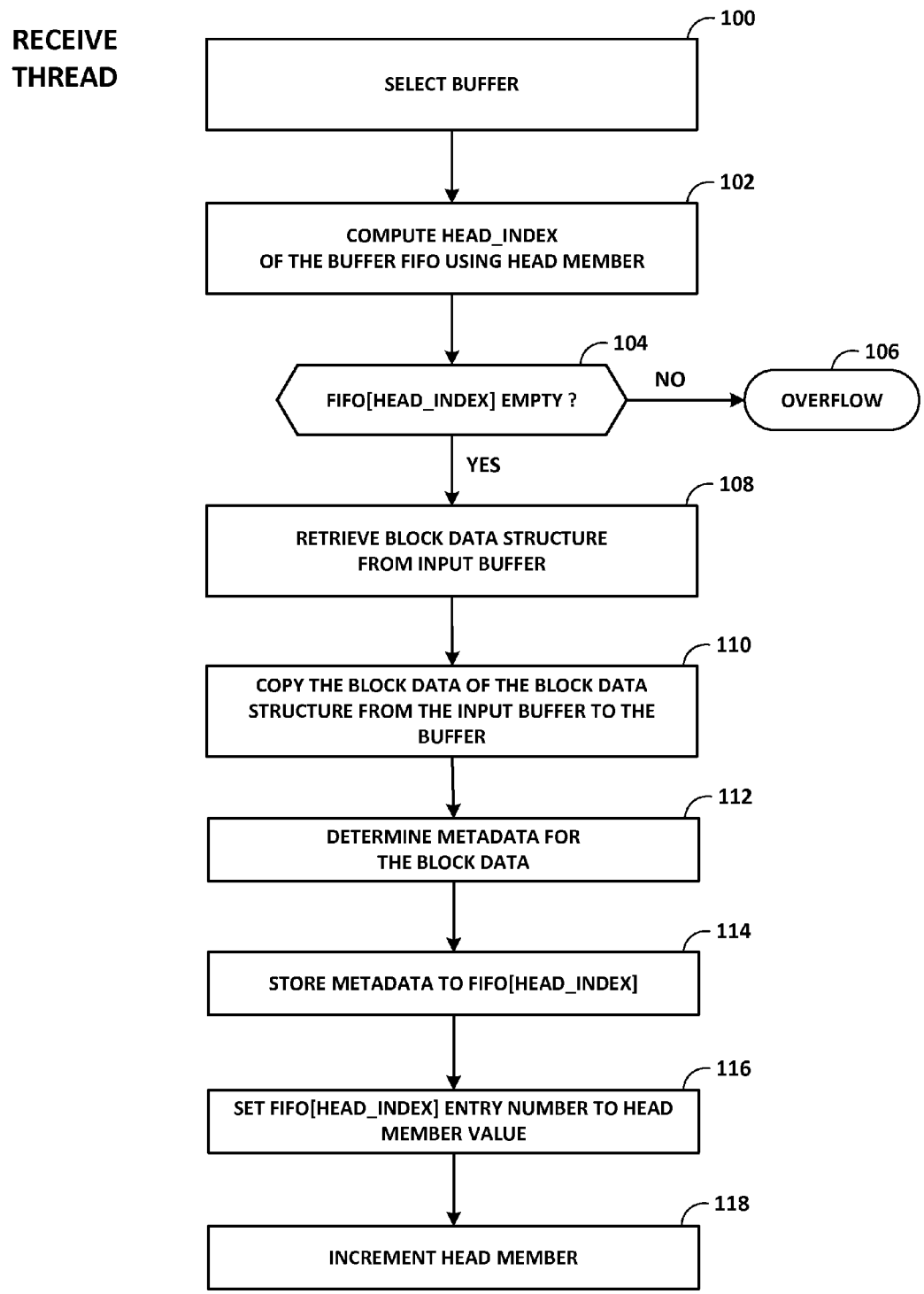
FIG. 4 is a flowchart illustrating an example write operation of a receive thread executing on a multi-core data offload system according to techniques described herein.

FIG. 4 is a flowchart illustrating an example write operation of a receive thread executing on a multi-core data offload system according to techniques described herein. This example write operation is described with respect to offload group 47 of FIG. 3, with FIFOs 70 being implemented as an instance of a class having data members including an array member, "FIFO," a head member (iHeadEntry) corresponding to the head reference of the FIFO, and a tail member (iTailEntry) corresponding to the tail reference of the FIFO. The head and tail members may in some instances be 64-bit integers. The array member, FIFO, may store FIFO entries at array indices, with each FIFO entry including member variables including an entry number (iEntry) and a pointer to a data block in a corresponding one of circular buffers 92. Each entry number may be a 64-bit integer. A particular FIFO entry of the FIFO member may be referenced herein using the well-known "[]" notation.

Receive thread 48 selects one of a plurality of buffers 50, buffer 50A, to receive the next data block to be read from input buffer 46 (100). Receive thread 48 computes variable HEAD_INDEX to FIFO 70A using the head member of FIFO 70A (102). Receive thread 48 may compute HEAD_INDEX as the value of iHeadEntry modulo a size of FIFO 70A. If the FIFO 70A entry at HEAD_INDEX, e.g., FIFO[HEAD_INDEX], already includes metadata for a data block (NO branch of 104), FIFO 70A has overflowed (106), and receive thread 48 may throw an exception.

If, however, the FIFO 70A entry at HEAD_INDEX is empty (e.g., has a value of −1, null, or some other empty indicator) (YES branch of 104), receive thread 48 reads the data block from input buffer 46 (108) and copies the data block to a next open location in circular buffer 72A (110). Receive thread 48 also determines metadata for the data block (112). Metadata for the data block may include a location (e.g., an index, pointer, memory address, memory offset, another type of reference or some combination of the above) to the data block in circular buffer 72A and a length of the data block in circular buffer 72A (e.g., the size of the data block). Metadata for the data block may also include, for instance, packet header information where the data block is a network packet or Ethernet datagram, video or image data, instrumentation data, and so on. Receive thread 48 stores the determined metadata to FIFO 70A at the FIFO entry located at HEAD_INDEX (114). In addition, receive thread 48 sets the entry number, iEntry, for FIFO[HEAD_INDEX] to the value of iHeadEntry (116) and increments iHeadEntry to advance the head reference of FIFO 70A (118). In operation, receive thread 48 does not employ locking or other synchronization mechanisms with respect to FIFOs 70 and circular buffers 72.

Figure 5:
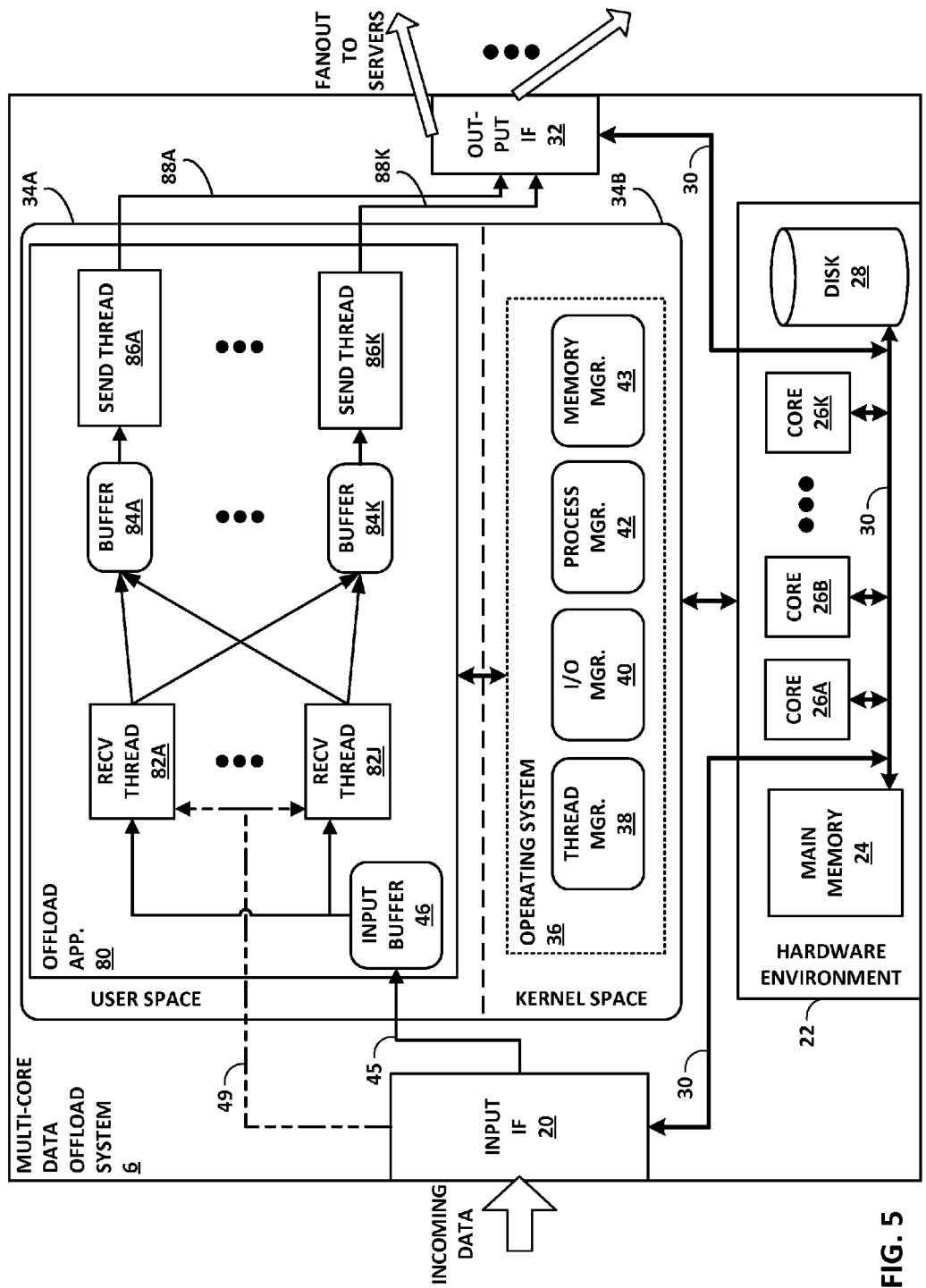
FIG. 5 is a block diagram illustrating, in further detail, an example instance of a multi-core offload system that operates according to techniques described in this disclosure.

FIG. 5 is a block diagram illustrating, in further detail, an example instance of a multi-core offload system 6 that operates according to techniques described in this disclosure. The architecture of multi-core offload system 6 of FIG. 5 may be similar to multi-core offload system 6 of FIG. 2 but includes offload application 80 that organizes and implements receive threads and send threads differently.

Operating system 36, executing in kernel space, provides an operating environment for offload application 80 (illustrated as "offload app. 80"), which may run as a process in user space 34A of main memory 40. Thread manager 38 manages instantiation and execution of application threads, including a plurality of receive threads 82A-82J (illustrated as "recv threads" and collectively referred to herein as "receive threads 82") and a plurality of send threads 86A-86K (collectively, "send threads 86") of offload application 88. For example, thread manager 38 may allocate the threads among cores 26 for execution by time-slicing access of the threads to cores 26, including thread switching operations, thread suspend, thread resume, thread wait. Thread manager 38 may also perform thread cleanup.

Offload application 80 includes receive threads 82 as well as send threads 86 each exclusively associated with a different one of lockless buffers 84A-84K. Lockless buffers 84 and send threads 86 may operate similarly to lockless buffers 50 and send threads 52 of offload application 44 of FIG. 2.

Like receive threads 48 of offload application 44 of FIG. 2, receive threads 82 copy, from input buffer 46, data blocks that constitute portions of data stream 45 to buffers 84. Again, data blocks may vary in length. Receive threads 82 may write data blocks to buffers 84 by round-robin, according to respective buffers 84 utilization (i.e., allocate to lightly-loaded buffers), or another method of allocation. Each copy operation by a receive thread 82 may include a call to a library operating in user space, which retrieves a pointer to the next data block and, in some instances, a data block length that allows the receive thread 82 to copy the referenced next data block to one of buffers 84.

In some examples, the input interface 20 delivers each received data block (or a reference to a copy of the received data block) to each of the receive threads 82 by notifications 49. In other words, input interface 20 prompts, using notifications 49, each of the receive threads 82 to offer a newly-received data block to each of the receive threads 48 for processing. Receive threads 82 may then arbitrate which of receive threads 48 is to process and thus write the data block to one of buffers 84. Receive threads 82 may, for example, arbitrate processing of a newly-received data block by each applying an arbitration function to all or a portion of the data block that results in an identifier for one of receive threads 82.

In contrast to receive threads 48, however, receive threads 82 may copy received data blocks into any of lockless buffers 84 of the offload application 80. In other words, buffers 84 and send threads 86 are not, in the example of FIG. 5, organized into offload groups 47 such that any of buffers 84 and send threads is exclusively associated with a single receive thread. Rather, any of receive threads 82 may potentially write to the same lockless buffer 84A, for example, over the course of execution.

Receive threads 82 arbitrate buffers 84 by atomically and locklessly accessing buffers 84 according to techniques described in this disclosure. If any of the other receive threads 82 is accessing buffer 84A, e.g., that receive thread 82A, e.g., has selected to write a data block to, receive thread 82B selects another one of buffers 84 for retry. Atomic and lockless access to buffers 84 is described in further detail below with respect to FIGS. 6-7.

Figure 6:
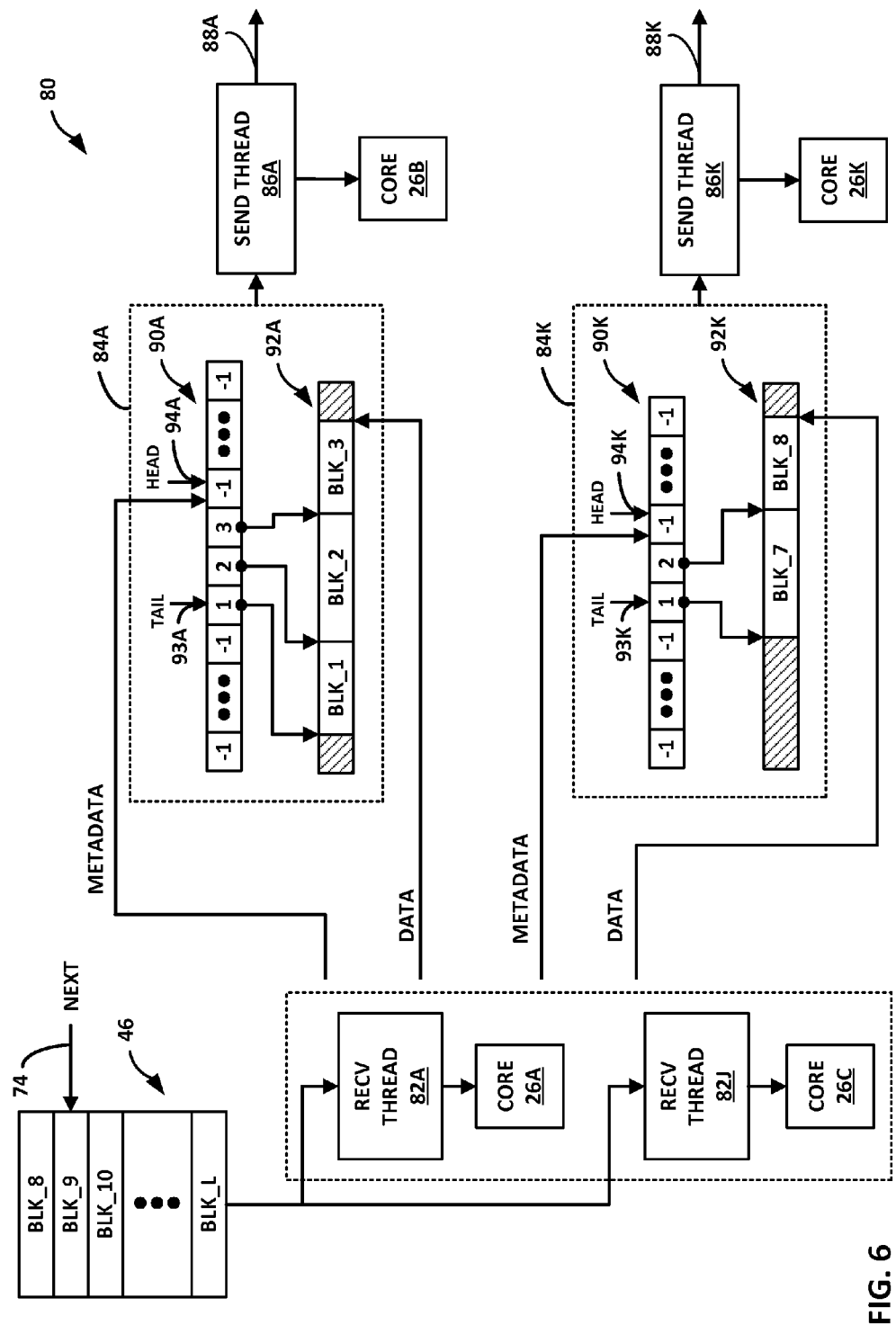
FIG. 6 is block diagram illustrating, in further detail, a plurality of receive threads as well as a plurality of send threads each associated with a lockless data structure in accordance with techniques described herein.

FIG. 6 is block diagram illustrating, in further detail, a plurality of receive threads as well as a plurality of send threads each associated with a lockless data structure. In this example of offload application 80, each of receive threads 82 and send threads 86 is illustrated as concurrently executing on a different one of cores 26. As described above with respect to FIG. 2, threads may time-slice among cores 26 during execution. The number of receive threads 82, the number of send threads 86, and the number of lockless buffers 84 may vary in various instances of offload application 80.

Input buffer 46 of offload application 80 stores data blocks. Next reference 74 indicates a next data block in input buffer 46 to be processed by receive threads 84 and send threads 86. Next reference 74 may in some instances be stored and updated by a user-level library instantiated by offload application 80, which returns next reference 74 to one or more of receive threads 82 in response to a library call or using a signaling mechanism. In some instances, offload application 80 stores and explicitly updates next reference 74. Next reference 74 may include a pointer that, when dereferenced, provides a location in physical or virtual memory space. Next reference 74 may also include, or refer to, a length of the data block being referenced.

In this example, each of buffers 84 includes a circular buffer for data block storage and a FIFO data structure (e.g., a queue) having FIFO entries that store metadata for the data blocks in the circular buffer. For example, buffer 84A includes circular buffer 92A and FIFO 90A that is a FIFO data structure. FIFOs 90A-90M and circular buffers 92A-92M are collectively referred to as "FIFOs 90" and "circular buffers 92," respectively. Each of buffers 84 includes substantially similar components providing substantially similar functionality, said components and functionality being described hereinafter with respect to buffer 84A.

FIFO 90A includes a head reference. "head index 94A," that references a head FIFO entry, i.e., the next empty entry for the queue that will receive the contents of an enqueue operation made with respect to FIFO 90A. FIFO 90A also includes a tail reference, "tail index 93A," that references the tail FIFO entry, i.e., the next FIFO entry to be returned in response to a dequeue operation made with respect to FIFO 90A. FIFO 90A may be implemented as an instance of a class having data members including an array of FIFO entries, a tail index, and a head index. Each of the FIFO entries of FIFO 90A references an entry number or an empty value (here illustrated as −1). For example, the FIFO entry number referenced by the tail reference of FIFO 90A has value 1, which may correspond to the first data block copied from input buffer 46 and stored to circular buffer 92A. As another example, the FIFO entry number referenced by the head index 94A of FIFO 90A includes the empty value (−1). The size of circular buffers 92 and the number of entries of FIFOs 90 may be user configurable, e.g., by command-line arguments to offload application 80. In some instances, each of the FIFO entries of FIFO 90A also includes a length of the data block. Each of circular buffers 92 may represent memory space in main memory 24. In some examples, each of circular buffers 92 represents a different memory space that is contiguous in main memory 24.

Each of receive threads 82 may operate substantially similarly to copy data blocks from input buffer 46 to circular buffers 92, said operations being described hereinafter with respect to receive thread 82A. Receive thread 82A may copy data blocks from input buffer 46 to any of circular buffers 92. That is, for any given data block read by receive thread 82A from input buffer 46, receive thread 82A selects one of buffers 84 to which to write the data block. If a selected buffer 84 is currently being copied into by one of receive threads 82A-82J, receive thread 82 selects a different one of buffers 84 to which to write the data block.

Because any of receive threads 82 may copy into any of buffers 84, receive threads 82 atomically and locklessly arbitrate access to buffers 84. As described in further detail below, upon selecting buffer 84A to receive a next read data block, for instance, receive thread 82A arbitrates access to buffer 84A among receive threads 82 by atomically reserving space in circular buffer 92A, copying the next read data block to the reserved space, and then publishing metadata to corresponding FIFO 90A to indicate that the copy operation is complete.

In some examples, receive thread 82A uses next reference 74 to input buffer 46 to identify the next data block for processing. Receive thread 82A may process the next data block to determine a data block length and, in some instances, other metadata for the next data block. Upon selecting buffer 84A to which to write the next data block, receive thread 82A uses the head index 94A of FIFO 90A to determine the next empty location in FIFO 90A. Receive thread 82A attempts to take the next empty location (i.e., the head entry) in FIFO 90A atomically in order to arbitrate access to circular buffer 92A among receive threads 82. For instance, receive thread 82A takes the next empty location by atomically setting a length of data block field (or another field) in the FIFO 90A head entry to the length of the next data block in input buffer 46 if and only if the length of data block field in the FIFO 90A head entry indicates that no other receive thread 82 has already modified the length of data block field to take the head entry of FIFO 90A. In some examples, a length of data block field value of 0 or −1 may indicate that no other receive thread 82 has modified the length of data block field.

Upon taking the FIFO 90A head entry by setting a length of data block field in the head entry, receive thread 82A copies the next data block to the next open memory location in circular buffer 92A without requesting a lock or employing any other synchronization mechanism with respect to circular buffer 92A. Receive thread 82A next sets an entry number in the FIFO 90A head entry to indicate that a write operation is complete. In other words, this publication to the entry number field of the FIFO 90A head entry for the copied data block completes a push operation made by receive thread 82A with respect to FIFO 90A and indicates that a write operation is complete. Receive thread 82A may thereafter update the head index 94A of FIFO 90A, next reference 74, and in some instances may update a reference to the next open memory location in circular buffer 92A (not shown). Receive thread 82A may then perform a similar operation with respect to buffer 84K, for instance, having FIFO 90K and circular buffer 92K.

As receive thread 82A copies data blocks from input buffer 46 to circular buffers 92, send threads 86A-86K concurrently execute to read data blocks from respective circular buffers 92A-92K and output the read data blocks in respective output data streams 88A-88K. For example, without requesting a lock or employing any other synchronization mechanism with respect to FIFO 90A, send thread 86A dequeues an entry of FIFO 90A containing metadata describing a data block stored by circular buffer 92A. Again, without requesting a lock or employing any other synchronization mechanism with respect to circular buffer 92A, send thread 86A uses the metadata of the dequeued entry to read the corresponding data block from circular buffer 92A, then outputs the data block as part of output data stream 88A. Using lockless buffers 84 in this way, receive threads 82 and send threads 86 may operate concurrently to parallelize an incoming data stream in an atomic and lockless manner.

As in the examples described above with respect to send threads 52, in some instances, send threads 86 may process read data blocks and/or corresponding metadata to, for example, determine a server to receive the read data block. That is, in some instances, send threads 86 may select a server or server component to receive a read data block based upon properties of the read data block and or corresponding metadata.

Figure 7:
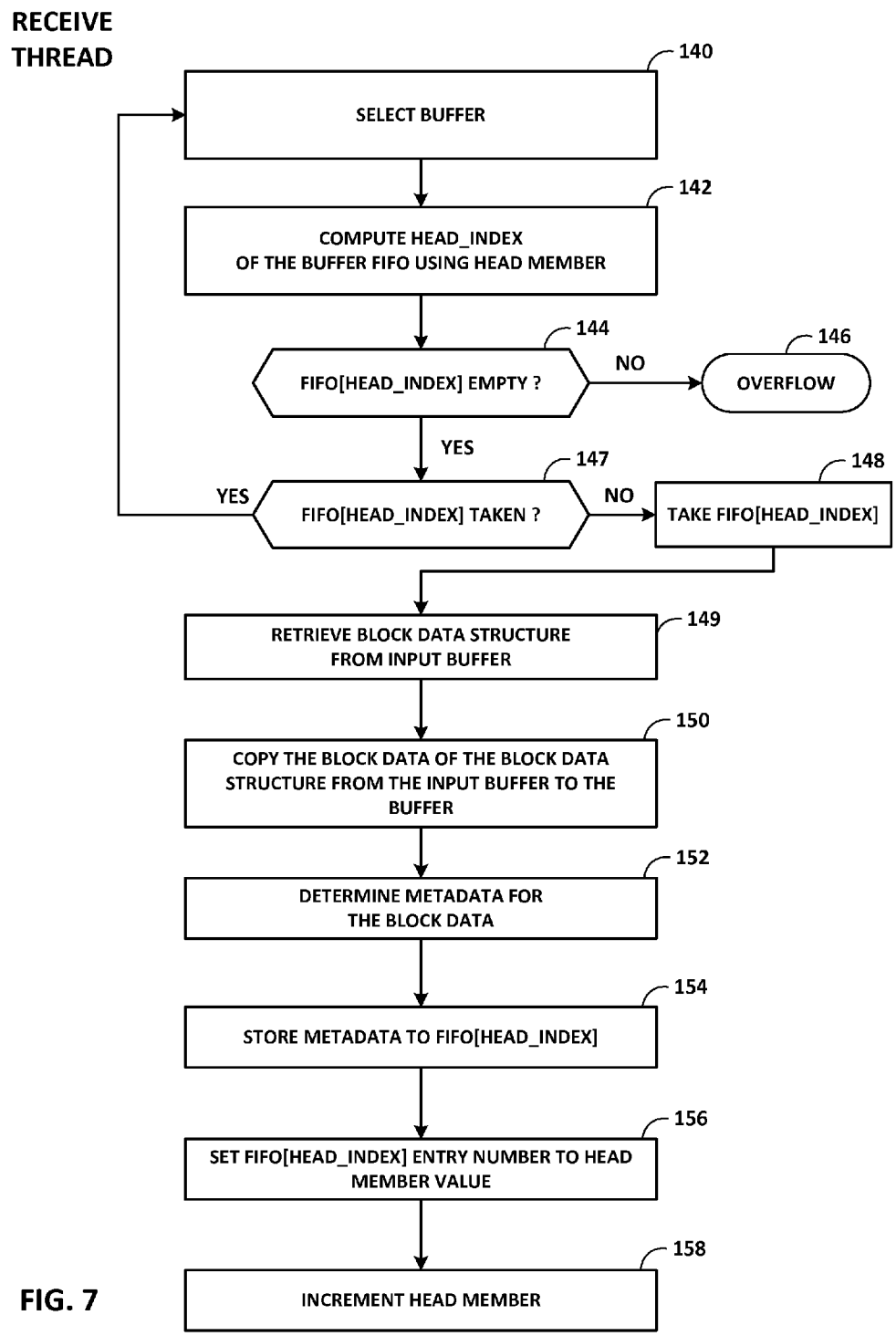
FIG. 7 is a flowchart illustrating an example write operation of a receive thread executing on a multi-core data offload system according to techniques described herein.

FIG. 7 is a flowchart illustrating an example write operation of a receive thread executing on a multi-core data offload system according to techniques described herein. This example write operation is described with respect to receive thread 82A of FIG. 6. FIFOs 90 may be implemented as an instance of a class having data members including an array member, "FIFO," a head member (iHeadEntry) corresponding to the head reference of the FIFO and a tail member (iTailEntry) corresponding to the tail reference of the FIFO. The array member, FIFO, may store FIFO entries at array indices, with each FIFO entry itself including three member variables: (1) entry number (iEntry); (2) length of data block; and (3) pointer to data block in a corresponding one of circular buffers 92. A particular FIFO entry of the FIFO member may be referenced herein using the well-known "[]" notation.

Receive thread 82A selects one of the plurality of buffers 84, buffer 84A, to receive the next data block to be read from input buffer 46 (140). Receive thread 82A computes variable HEAD_INDEX to FIFO 90A using the head member of FIFO 90A (142). Receive thread 82A may compute HEAD_INDEX as the value of iHeadEntry modulo a size of FIFO 90A. If the FIFO 90A entry at HEAD_INDEX, i.e., FIFO [HEAD_INDEX], already includes metadata for a data block (NO branch of 144), FIFO 90A has overflowed (146), and receive thread 82A may throw an exception.

If, however, the FIFO 90A entry at HEAD_INDEX is empty (e.g., has a value of −1, null, or some other empty indicator) (YES branch of 144), receive thread 82A determines whether to take (or "claim") the FIFO 90A entry at HEAD_INDEX (147). In some examples, receive thread 82A reads the length of data block member variable of FIFO [HEAD_INDEX] and, if the length of data block member variable value indicates that FIFO[HEAD_INDEX] is already taken by another one of receive threads 82 (YES branch of 147), receive thread 82A may select another one of buffers 84. In some instances, however, receive thread 82A may attempt to take the next FIFO 90A entry after HEAD_INDEX, i.e., FIFO[HEAD_INDEX+1] and so forth until receive thread 82A finds a FIFO 90A entry that has not already been taken. In this way, multiple receive threads 84 may concurrently perform respective write operations using buffer 84A. Further, because the length of data block member variable value has already been set in FIFO entries that have been taken, receive thread 82A may use the variable values of the taken FIFO entries to determine a next free location in circular buffer 92A.

If the length of data block member value indicates that FIFO[HEAD_INDEX] is not already taken by another one of receive threads 82 (NO branch of 147), receive thread 82A atomically and locklessly takes FIFO[HEAD_INDEX](148). In some examples, receive thread 82A may take FIFO [HEAD_INDEX] by setting the length of data block member variable to a length of the next data block to be read from input buffer 46 by receive thread 82A.

Receive thread 82A reads the data block from input buffer 46 (149) and copies the data block to a next open location in circular buffer 92A (150). Receive thread 82A also determines metadata for the data block (152). Metadata for the data block may include a location (e.g., an index, pointer, memory address, memory offset, another type of reference or some combination of the above) to the data block in circular buffer 92A and a length of the data block in circular buffer 92A (e.g., the size of the data block). Metadata for the data block may also include, for instance, packet header information where the data block is a network packet or Ethernet datagram, video or image data, instrumentation data, and so on. Receive thread 82A stores the determined metadata to FIFO 90A at the FIFO entry located at HEAD_INDEX (154). In addition, receive thread 82A sets the entry number, iEntry, for FIFO [HEAD_INDEX] to the value of iHeadEntry (156). Setting the entry number may indicate to other receive threads 82 that the complete data block is now stored to circular buffer 92A and may be sent by a send thread 86. Receive thread 82A further increments iHeadEntry to advance the head reference of FIFO 90A (158). In operation, receive thread 82A does not employ locking or other synchronization mechanisms with respect to FIFOs 90 and circular buffers 92.

Figure 8:
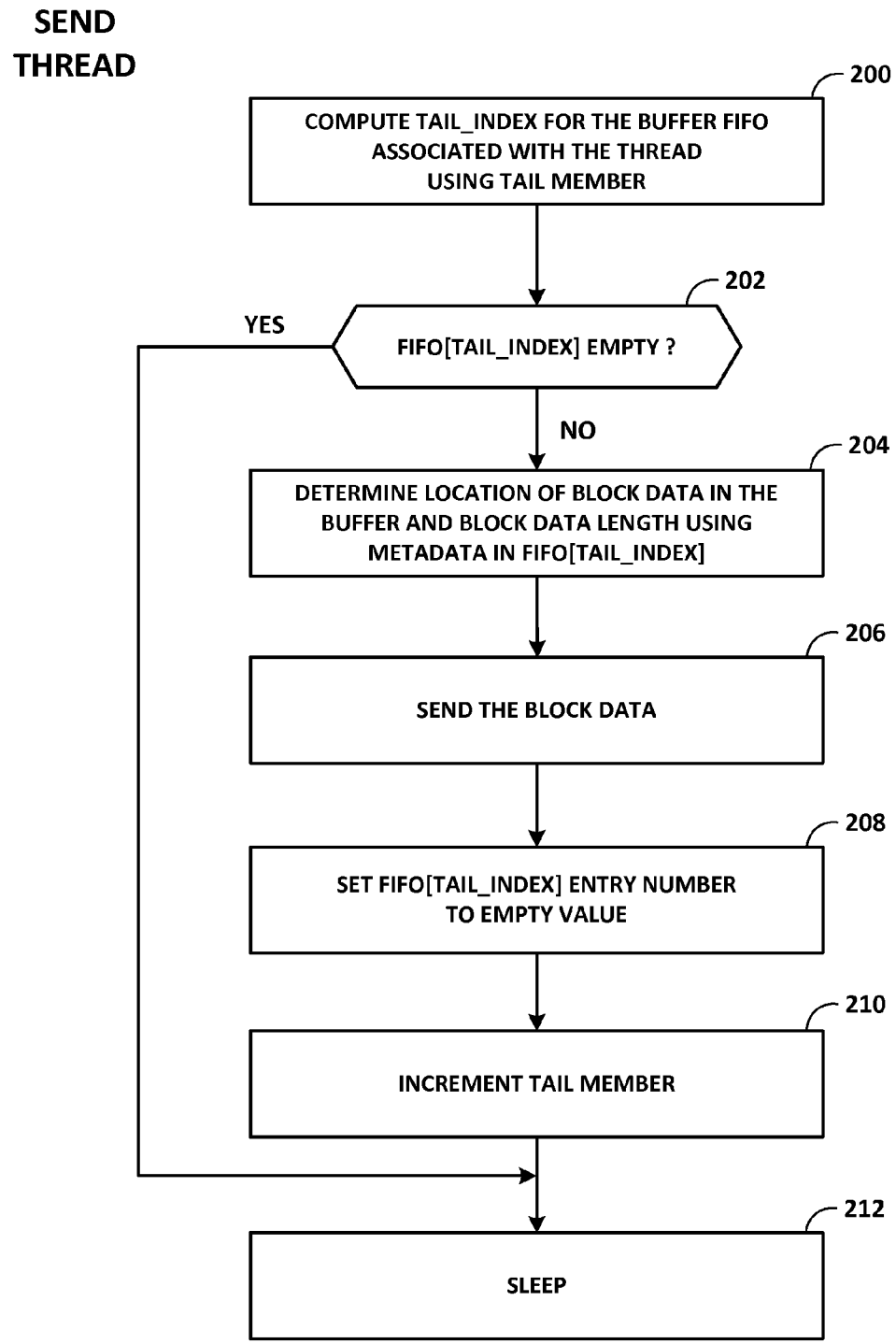
FIG. 8 is a flowchart illustrating an example send operation of a send thread executing on a multi-core data offload system according to techniques described herein.

FIG. 8 is a flowchart illustrating an example send operation of a send thread executing on a multi-core data offload system according to techniques described herein. This example operation is described with respect to offload group 47 of FIG. 3, in particular send thread 52A, with FIFOs 70 being implemented as an instance of a class having data members including an array member, "FIFO," a head member (iHeadEntry) corresponding the head reference of the FIFO, and a tail member (iTailEntry) corresponding to the tail reference of the FIFO. The array member, FIFO, may store FIFO entries at array indices, with each FIFO entry including member variables including an entry number (iEntry) and a pointer to a data block in a corresponding one of circular buffers 72. The example send operation described below is similarly applicable to operations of send thread 86 and buffers 84 of FIGS. 5-6.

Send thread 52A is associated with buffer 50 including FIFO 70A and circular buffer 72A. On waking (or invocation by another thread of offload application 44), send thread 52A computes variable TAIL_INDEX to FIFO 70A using the tail member of FIFO 70A (200). Send thread 52A may compute TAIL_INDEX as the value of iTailEntry modulo a size of FIFO 70A. If the entry number, iEntry, of the FIFO entry at TAIL_INDEX of FIFO 70A, e.g., FIFO[TAIL_INDEX], indicates the FIFO entry is empty (e.g., the entry number has value −1) (YES branch of 202), there is no corresponding data block to offload and send thread 52A sleeps (212). In some instances, a value for the entry number, iEntry, of the FIFO entry at TAIL_INDEX of FIFO 70A that is different than the value of the tail member may indicate that the FIFO entry is empty.

If, however, the entry number indicates a FIFO entry is not empty (NO branch of 202), send thread 52A uses metadata (e.g., the pointer to the corresponding data block) stored in the FIFO entry to determine a location of a data block in circular buffer 72A (204). Send thread 52A reads the data block from the location in circular buffer 72A and offloads the data block as data stream 54A (206). To clear the FIFO entry, thus dequeuing the FIFO entry from FIFO 70A, send thread 52A sets the entry number, iEntry, to indicate an empty value (e.g., −1) (208). In addition, send thread 52A increments the tail member, iTailEntry, to advance FIFO 70A (210). In operation, send thread 52A does not employ locking or other synchronization mechanisms with respect to FIFO 70A and circular buffer 72A. Upon advancing FIFO 70A, send thread 52A sleeps (212).

In some examples, circular buffer 72A may represent contiguous memory space. Receive thread 48 may, using a lockless model that accords with techniques described herein, therefore write multiple data blocks to a contiguous memory space in circular buffer 72A. In effect, receive thread 48 concatenates the multiple data blocks. As a result, send thread 52A may offload multiple data blocks using a single read operation by reading an aggregate memory block that encompasses each of the multiple data blocks to be read. In such examples, send thread 52A reads multiple FIFO 70A entries at (204). The first one of the read FIFO 70A entries identifies a memory location in circular buffer 72A of the first of multiple data blocks corresponding to the multiple read FIFO 70A entries. Send thread 52A may then sum sizes for each of multiple data blocks corresponding to the multiple read FIFO 70A entries to determine the size of the memory block to read. Alternatively, send thread 52A may determine the size of the memory block to read using memory locations in the first and last one of the read FIFO 70A entries and a size of the data block specified in the last one of the read FIFO 70A entries. Upon determining a location and size of the memory block that encompasses each of the multiple data blocks to be read, send thread 52A reads the memory block from the location in circular buffer 72A and offloads the memory block as data stream 54A at (206). In such examples, to clear the multiple FIFO 70A entries that corresponding to the multiple data blocks read by send thread 52, send thread 52A sets the entry numbers, iEntry, of the multiple FIFO 70A entries to indicate an empty value (e.g., −1) at (208).

Send thread 52A may offload the memory block having multiple data blocks as a payload of a single network packet. An upper limit number of data blocks that may be offloaded by send thread 52A before sleeping may be user configurable. e.g., by command-line arguments to offload application 44. In this way, send thread 52A may send multiple data blocks (in some instances, arriving as multiple payloads or network packets) as a single payload of stream 54A. This aggregation technique may further improve a performance of send thread 52A and by reducing a number of processor cycles that would otherwise by utilized to offload the multiple data blocks.

Figure 9:
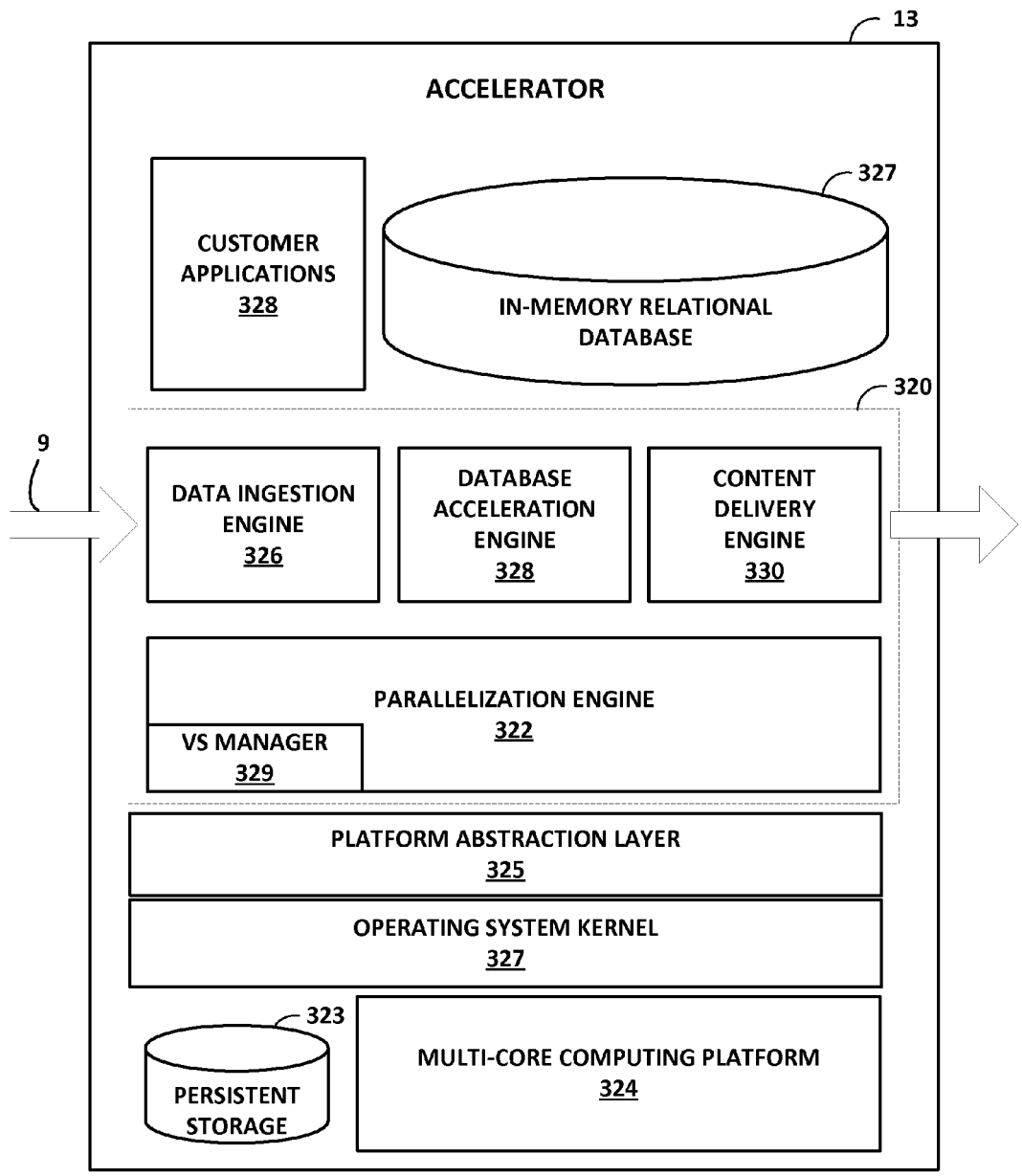
FIG. 9 is a block diagram illustrating an example instance of a transactional data accelerator that provides high-performance transactional data acceleration in accordance with techniques described in this disclosure.

FIG. 9 is a block diagram illustrating an example instance of a transactional data accelerator that provides high-performance transactional data acceleration in accordance with techniques described in this disclosure. In the illustrated example, accelerator 13 that includes a virtual machine 320 specifically designed to accelerate and provide customizable processing to large quantities of data from one to many data sources. Accelerator 13 may represent an example instance of servers 13 of FIG. 1 that receive outgoing data streams 9 from multi-core data offload system 6. That is, each of servers 13 may represent a different instance of accelerator 13. Accelerator 13 is typically implemented on a computing platform, such as a high-end server, having a multi-core computing platform 324. Computing platform 324 may include any number of processors and any number of hardware cores from, for example, four to thousands.

In the example of FIG. 9, accelerator 13 includes a platform abstraction layer 325 that presents certain functionality of underlying operating system kernel 327 to virtual processor 320, such as memory management and hardware I/O. In one example, virtual processor 320 may execute within an overall process space provided by operating system kernel 327. Operating system kernel 327 may be, for example, a Linux, Berkeley Software Distribution (BSD), another Unix-variant kernel, or a Windows operating system kernel, available from Microsoft Corp.

Data ingest engine 326 of virtual processor 320 operates to "ingest" incoming transactional data. Data ingest engine 326 may receive data from thousands to millions of concurrent inbound connections, each streaming data inwards without needing to be prompted for new information. Data can be ingested from a few "fat" pipes or over thousands of connections from individual devices or sensors. Data types to be processed can be structured, unstructured or both. For example, data ingest engine 326 may include one or more data adaptors to receive and process formatted data, e.g., XML and CSV formatted data.

As incoming data is "ingested" into the system by data ingest engine 326, database acceleration engine 328 operates on in-memory database 327. Database acceleration engine 328 provide a highly scalable data processing engine that has primary responsibility for coordination of activities between data ingest engine 326, customer applications 328, and content delivery engine 330. In some examples, database acceleration engine 328 exposes a standard SQL-based API by which data ingest engine 326, customer applications 328, and content delivery engine 330 interact with in-memory database 327 and execute under the control of parallelization engine 322 such that extremely low latency processing occurs. In other words, the database acceleration engine 328 may provide a SQL-accessible, in-flight view at incoming data as is ingested and stored within in-memory database 327. In general, database acceleration engine 328 utilizes the parallelization engine 322 to decompose incoming transactions or events into fine-grained blocks of operations that are then deployed to the closest and most available hardware execution core relevant to the data required for processing. The database acceleration engine 328 enables the decomposition, processing, concurrency checks, and re-assembly of transactions and events into computed results.

Content delivery engine 330 may output data to one, several, or many destinations, i.e., data consumers. That is, content delivery engine 330 provides the ability for processed data to be 'pushed' (delivered) from in-memory database 320 as a targeted data stream to data consumers, which may be other systems, applications, or databases. For example, in some embodiments, content delivery engine may be configured to deliver data via a single targeted stream to another computing system or data warehouse. In addition, content delivery engine 330 may provide an interactive, bidirectional data delivery and communications engine to interactively and bi-directionally broadcast data to large audiences or devices, i.e., data consumers.

In some embodiments, data ingest engine 326 and content delivery engine 330 may support "select-cast" capabilities described herein that enable either a data source, e.g., multi-core data offload system 6, or a data consumer (or both) to tailor the content that is sent or received. This may take the form of private data channels, i.e., interactive and personalized data streams unique to each source or consumer. Each connection may be a continuous, open connection such that data consumers need not poll for changed data. Data ingest engine 326 and content delivery engine may supports millions of open continuous connections to data sources and data consumers.

Parallelization engine 322 of virtual processor 320 provides an abstracted execution environment that utilizes multicore processors and motherboard architectures to form a highly integrated, low latency, scalable, parallel platform for execution of data ingest engine 326, database acceleration engine 328, virtual storage manager 329, and content delivery engine 330. That is, parallelization engine 322 provides an execution platform optimized for multi-core and many-core systems to provide real time concurrency, memory management and task management capabilities with fine-grained parallelism on a per-core basis. Further, parallelization engine 322 ensures optimal use of instruction and data caches (e.g., L1, L2 and L3 caches) while implementing fine-grained parallelism by decomposing all processing into tasks that can independently execute on individual cores and by minimizing the requirement for concurrent locking structures. This allows data ingest engine 326, database acceleration engine 328, virtual storage manager 329, and content delivery engine 330 to operate within virtual machine 320 with a high degree of parallel execution on multi-core computing platform 324. In this way, parallelization engine 322 may be viewed as a massively parallel multi-core operating system that provides a virtual processor (virtual machine 320) for processing the ingested data.

Virtual storage manager 329 of the software virtual machine 320 provides self-organization and allows the virtual machine to scale out beyond physical in-memory boundaries and, when required, integrate the use of physically external memory devices (e.g., hard drives). This allows in-memory database 327 to spool out to external memory while performing the transactions to expand its memory space to utilize persistent storage 323. For example, virtual storage manager 329 may temporarily spool transactional data if the data to does not fit within the physical memory boundaries and push data out for storage and computation. Moreover, all of these services for virtual storage management are parallelized within virtual machine 320 and executed by parallelization engine for execution on multi-core computing platform 324.

In addition, virtual storage manager 329 manages the persistent storage 323 to allow for recovery from a failure or for users to shut down the system and bring it back up with no associated data loss. The disk persistence implementation guarantees no transaction loss in the event of a failure. As explained in further detail below, copies of in-memory database 327 may be written to checkpoint files on a configurable time interval. Further, in some cases, transactions may be recorded in journal files and transaction commits only occur after entries are written to the journal files. To recover from a system failure, the persistence subsystem of virtual storage manager 329 may apply the latest checkpoint file and then apply all journal entries since the last checkpoint to recreate in-memory database 327. In this way, persistence may be implemented to be ACID (atomicity, consistency, isolation, durability) compliant.

Additional details regarding transactional accelerator are found in U.S. patent application Ser. No. 13/524,881, filed Jun. 15, 2012 and entitled, "SOFTWARE VIRTUAL MACHINE FOR ACCELERATION OF TRANSACTIONAL DATA PROCESSING"; U.S. patent application Ser. No. 13/524,959, filed Jun. 15, 2012 and entitled, "SOFTWARE VIRTUAL MACHINE FOR CONTENT DELIVERY"; and U.S. patent application Ser. No. 13/525,036, filed Jun. 15, 2012 and entitled, "SOFTWARE VIRTUAL MACHINE FOR DATA INGESTION," the entire contents of each of which being incorporated by reference herein.

The techniques described herein may be implemented in hardware, software, firmware, or any combination thereof.

Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the invention have been described. These and other embodiments are within the scope of the following claims.

What is claimed is:

1. A data offload system comprising:
 a multi-core hardware processor having a plurality of execution cores;
 an offload application to execute on the multi-core hardware processor, wherein the offload application comprises a plurality of threads;
 an input interface to receive an incoming data stream and write a plurality of data blocks of the incoming data stream to an input buffer accessible to the offload application;
 a first lockless buffer and a second lockless buffer;
 a receive thread of the plurality of threads to read a first one the plurality of data blocks from the input buffer and to read a second one the plurality of data blocks from the input buffer,
 wherein the receive thread performs a first write operation to write the first data block to the first lockless buffer without locking the first lockless buffer to allow access to the first lockless buffer by other threads of the plurality of threads while the receive thread performs the first write operation, and
 wherein the receive thread performs a second write operation to write the second data block to the second lockless buffer without locking the second lockless buffer to allow access to the second lockless buffer by other threads of the plurality of threads while the receive thread performs the second write operation;
 a first send thread of the plurality of threads to perform a first send operation to send the first data block from the first lockless buffer without locking the first lockless buffer to allow access to the first lockless buffer by other threads of the plurality of threads while the first send thread performs the first send operation; and
 a second send thread of the plurality of threads to perform a second send operation to send the second data block from the second lockless buffer without locking the second lockless buffer to allow access to the second lockless buffer by other threads of the plurality of threads while the second send thread performs the second send operation.

2. The data offload system of claim 1,
 wherein the receive thread reads a third one of the plurality of data blocks from the input buffer, and
 wherein the receive thread performs a third write operation to write the third data block to the first lockless buffer concurrently with the first send thread performing the first send operation.

3. The data offload system of claim 1,
 wherein the first lockless buffer comprises a First-In-First-Out (FIFO) data structure and a circular buffer,
 wherein, to perform the first write operation, the receive thread writes metadata for the first data block to the FIFO data structure and writes the first data block to the circular buffer.

4. The data offload system of claim 3,
 wherein the FIFO data structure comprises a plurality of FIFO entries,
 wherein the FIFO data structure is associated with a head member usable for determining a head FIFO entry of the plurality of FIFO entries, and
 wherein the FIFO data structure is associated with a tail member usable for determining a tail FIFO entry of the plurality of FIFO entries.

5. The data offload system of claim 4, wherein, to perform the first write operation, the receive thread:
 determines the head FIFO entry of the FIFO data structure using the head member;
 copies the first data block from the input buffer to the circular buffer;
 sets a value for an entry number stored by the head FIFO entry to indicate the head FIFO entry is not empty; and
 subsequent to setting the value for the entry number, increments the head member.

6. The data offload system of claim 5, wherein to set the value for the entry number the receive thread sets the entry number to a value of the head member.

7. The data offload system of claim 5,
 wherein the receive thread:
 reads a third one of the plurality of data blocks from the input buffer,
 determines a new head FIFO entry of the FIFO data structure using the incremented head member;
 determines an entry number stored by the new head FIFO entry indicates the new head FIFO entry is not empty; and in response to determining the entry number stored by the new head FIFO entry indicates the new head FIFO entry is not empty, throws an exception to indicate the first data buffer is overflowed.

8. The data offload system of claim 4, wherein, to perform the first send operation, the first send thread:
determines the tail FIFO entry of the FIFO data structure using the tail member,
identifies a location of the first data block in the circular buffer using metadata for the first data block stored by the tail FIFO entry;
sends the first data block by an output interface of the data offload system; and
increments the tail member.

9. The data offload system of claim 8, wherein, to perform the first send operation, the first send thread:
sets an entry number for the tail FIFO entry to indicate the tail FIFO entry is empty.

10. The data offload system of claim 8, wherein the first send thread:
determines whether an entry number for the tail FIFO entry is equal to a value of the tail member;
in response to determining the entry number for the tail FIFO entry is equal to a value of the tail member, performs the first send operation; and
in response to determining the entry number for the tail FIFO entry is not equal to a value of the tail member, sleeps.

11. The data offload system of claim 4, wherein to perform the first write operation the receive thread:
determines the head FIFO entry of the FIFO data structure using the head member;
determines whether the head FIFO entry of the FIFO data structure is taken;
in response to determining the head FIFO entry of the FIFO data structure is not taken:
copies the first data block from the input buffer to the circular buffer;
sets a value for an entry number stored by the head FIFO entry to indicate the head FIFO entry is not empty; and
increments the head member.

12. The data offload system of claim 11,
wherein each of the plurality of FIFO entries includes a length of data block member variable,
wherein to determine whether the head FIFO entry of the FIFO data structure is taken the receive thread determines whether the length of data block member variable of the head FIFO entry indicates another receive thread has modified the length of data block member variable of the head FIFO entry.

13. The data offload system of claim 11, wherein the receive thread is a first receive thread, the data offload system further comprising:
a second receive thread to read a third one of the plurality of data blocks from the input buffer,
wherein the second receive thread performs a third write operation to write the third data block to the first lockless buffer concurrently with the first receive thread performing the first write operation.

14. The data offload system of claim 1, further comprising:
a plurality of offload groups, wherein each of the plurality of offload groups comprises:
an instance of the first lockless buffer;
an instance of the second lockless buffer;
an instance of the receive thread;
an instance of the first send thread; and
an instance of the second send thread.

15. The data offload system of claim 1,
wherein the first lockless buffer comprises a contiguous memory space, wherein the receive thread reads a third one of the plurality of data blocks from the input buffer and performs a third write operation to write the third data block to a memory location of the first lockless buffer that is contiguous to a memory location of the first lockless buffer that is occupied by the first data block, and
wherein the first send thread, to perform the first send operation and without locking the first lockless buffer, reads the first data block and third data block from the first lockless buffer using a single read operation and sends the first data block and the third data block from the data offload system.

16. A method comprising:
receiving an incoming data stream;
writing a plurality of data blocks of the incoming data stream to an input buffer;
executing, with a multi-core hardware processor having a plurality of execution cores, an offload application that includes a first lockless buffer, a second lockless buffer, and a plurality of threads that include a first receive thread, a first send thread, and a second send thread;
reading, with the receive thread, a first one the plurality of data blocks and a second one the plurality of data blocks from the input buffer;
performing a first write operation, with the receive thread, to write the first data block to the first lockless buffer without locking the first lockless buffer to allow access to the first lockless buffer by other threads of the plurality of threads while the receive thread performs the first write operation;
performing a second write operation, with the receive thread, to write the second data block to the second lockless buffer without locking the second lockless buffer to allow access to the second lockless buffer by other threads of the plurality of threads while the receive thread performs the second write operation;
performing a first send operation, with the first send thread, to send the first data block from the first lockless buffer without locking the first lockless buffer to allow access to the first lockless buffer by other threads of the plurality of threads while the first send thread performs the first send operation; and
performing a second send operation, with the second send thread, to send the second data block from the second lockless buffer without locking the second lockless buffer to allow access to the second lockless buffer by other threads of the plurality of threads while the second send thread performs the second send operation.

17. The method of claim 16, further comprising:
reading, with the receive thread, a third one of the plurality of data blocks from the input buffer, and
performing a third write operation, with the receive thread, to write the third data block to the first lockless buffer concurrently with the first send thread performing the first send operation.

18. The method of claim 16,
wherein the first lockless buffer comprises a First-In-First-Out (FIFO) data structure and a circular buffer,
wherein, to perform the first write operation, the receive thread writes metadata for the first data block to the FIFO data structure and writes the first data block to the circular buffer.

19. The method of claim 18,
wherein the FIFO data structure comprises a plurality of FIFO entries,
wherein the FIFO data structure is associated with a head member usable for determining a head FIFO entry of the plurality of FIFO entries, and
wherein the FIFO data structure is associated with a tail member usable for determining a tail FIFO entry of the plurality of FIFO entries.

20. The method of claim 19, wherein performing the first write operation comprises:
determining the head FIFO entry of the FIFO data structure using the head member;
copying the first data block from the input buffer to the circular buffer;
setting a value for an entry number stored by the head FIFO entry to indicate the head FIFO entry is not empty; and
subsequent to setting the value for the entry number, incrementing the head member.

21. The method of claim 20, wherein to set the value for the entry number the receive thread sets the entry number to a value of the head member.

22. The method of claim 20, further comprising:
reading, with the receive thread, a third one of the plurality of data blocks from the input buffer;
determining, with the receive thread, a new head FIFO entry of the FIFO data structure using the head member;
determining an entry number stored by the new head FIFO entry indicates the new head FIFO entry is not empty; and
in response to determining the entry number stored by the new head FIFO entry indicates the new head FIFO entry is not empty, throwing an exception to indicate the first data buffer is overflowed.

23. The method of claim 19, wherein performing the first send operation comprises:
determining the tail FIFO entry of the FIFO data structure using the tail member;
identifying a location of the first data block in the circular buffer using metadata for the first data block stored by the tail FIFO entry;
sending the first data block by an output interface coupled to the multi-core hardware processor; and
incrementing the tail member.

24. The method of claim 23, wherein performing the first send operation comprises:
setting an entry number for the tail FIFO entry to indicate the tail FIFO entry is empty.

25. The method of claim 23, further comprising:
determining, with the first send thread, whether an entry number for the tail FIFO entry is equal to a value of the tail member,
in response to determining the entry number for the tail FIFO entry is equal to a value of the tail member, performing the first send operation; and
in response to determining the entry number for the tail FIFO entry is not equal to a value of the tail member, sleeping.

26. The method of claim 19, wherein performing the first write operation comprises:
determining the head FIFO entry of the FIFO data structure using the head member;
determining whether the head FIFO entry of the FIFO data structure is taken;
in response to determining the head FIFO entry of the FIFO data structure is not taken:
copying the first data block from the input buffer to the circular buffer;
setting a value for an entry number stored by the head FIFO entry to indicate the head FIFO entry is not empty; and
subsequent to setting the value for the entry number, incrementing the head member.

27. The method of claim 26,
wherein each of the plurality of FIFO entries includes a length of data block member variable,
wherein determining whether the head FIFO entry of the FIFO data structure is taken comprises determining whether the length of data block member variable of the head FIFO entry indicates another receive thread has modified the length of data block member variable of the head FIFO entry.

28. The method of claim 26, wherein the receive thread is a first receive thread, method further comprising:
reading, with a second receive thread, a third one of the plurality of data blocks from the input buffer, and
performing, with the second receive thread, a third write operation to write the third data block to the first lockless buffer concurrently with the first receive thread performing the first write operation.

29. The method of claim 16, wherein the first lockless buffer comprises a contiguous memory space, the method further comprising:
reading, with the receive thread, a third one of the plurality of data blocks from the input buffer, and
performing a third write operation, with the receive thread, to write the third data block to a memory location of the first lockless buffer that is contiguous to a memory location occupied by the first data block,
wherein performing the first send operation comprises reading the first data block and third data block from the first lockless buffer using a single read operation and without locking the first lockless buffer and sending the first data block and the third data block by an output interface coupled to the multi-core hardware processor.

30. A non-transitory computer-readable medium comprising instructions for causing one or more processors to:
receive an incoming data stream;
write a plurality of data blocks of the incoming data stream to an input buffer;
execute an offload application that includes a first lockless buffer, a second lockless buffer, and a plurality of threads that include a first receive thread, a first send thread, and a second send thread;
read, with the receive thread, a first one the plurality of data blocks and a second one the plurality of data blocks from the input buffer;
perform a first write operation, with the receive thread, to write the first data block to the first lockless buffer without locking the first lockless buffer to allow access to the first lockless buffer by other threads of the plurality of threads while the receive thread performs the first write operation;
perform a second write operation, with the receive thread, to write the second data block to the second lockless buffer without locking the second lockless buffer to allow access to the second lockless buffer by other threads of the plurality of threads while the receive thread performs the second write operation;
perform a first send operation, with the first send thread, to send the first data block from the first lockless buffer without locking the first lockless buffer to allow access to the first lockless buffer by other threads of the plurality of threads while the first send thread performs the first send operation; and perform a second send operation, with the second send thread, to send the second data block from the second lockless buffer without locking the second lockless buffer to allow access to the second lockless buffer by other threads of the plurality of threads while the second send thread performs the second send operation.

* * * * *